(12) United States Patent
Redelman et al.

(10) Patent No.: US 7,543,695 B2
(45) Date of Patent: Jun. 9, 2009

(54) HYDRAULIC SYSTEM FOR AN ELECTRO-MECHANICAL TRANSMISSION AND METHOD OF PROVIDING FLUID TO TRANSMISSION COMPONENTS

(75) Inventors: James A. Redelman, Indianapolis, IN (US); Clifford H. Oehme, Avon, IN (US); James P. Ordo, Avon, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 504 days.

(21) Appl. No.: 11/459,248

(22) Filed: Jul. 21, 2006

(65) Prior Publication Data
US 2008/0017472 A1   Jan. 24, 2008

(51) Int. Cl.
*F04B 23/04* (2006.01)
*B62D 55/08* (2006.01)
(52) U.S. Cl. .................. 192/221; 180/9.1; 417/426
(58) Field of Classification Search ............... 417/426
See application file for complete search history.

(56) References Cited

U.S. PATENT DOCUMENTS

| 6,390,947 | B1 * | 5/2002 | Aoki et al. ............... 477/3 |
| 6,447,262 | B1 | 9/2002 | Clements ............... 417/251 |
| 6,647,326 | B2 * | 11/2003 | Nakamori et al. ......... 701/22 |
| 6,709,362 | B2 * | 3/2004 | Tomohiro et al. ........... 477/3 |
| 6,913,558 | B2 * | 7/2005 | Mori et al. ............... 477/3 |
| 7,163,481 | B2 * | 1/2007 | Takagi et al. ............. 475/101 |

* cited by examiner

*Primary Examiner*—Rodney H Bonck

(57) ABSTRACT

A hydraulic system for an electro-mechanical transmission includes an electrically-powered main pump, a battery powered auxiliary pump and an output pump. The main pump provides fluid to transmission components such as a torque-transmitting mechanism. The auxiliary pump provides fluid pressure to engage the torque-transmitting mechanism when electric power to the main pump is unavailable or the main pump is otherwise inoperable. The engaged torque-transmitting mechanism enables rotation of an output member which mechanically powers the output pump so that it may provide fluid to the transmission components in lieu of the main pump. A method of providing fluid to transmission components is also provided.

13 Claims, 2 Drawing Sheets

HYDRAULIC SYSTEM FOR AN ELECTRO-MECHANICAL TRANSMISSION AND METHOD OF PROVIDING FLUID TO TRANSMISSION COMPONENTS

TECHNICAL FIELD

The invention relates to a hydraulic system for an electro-mechanical transmission, especially on a tracked vehicle wherein the hydraulic system is at least partially powered by electrical input.

BACKGROUND OF THE INVENTION

A vehicle transmission typically includes a hydraulic system that provides cooling and lubrication to transmission components and may pressurize torque-transmitting mechanisms to enable transmission shifting and vehicle braking. An electronic control unit is often provided to control fluid flow, and the hydraulic system usually utilizes a pump and various valves, to direct fluid in response to vehicle operating requirements.

Electric tracked vehicles, such as tanks, often utilize one or more electric propulsion and steering motors to control speed and direction of the tracks either though a mechanical power path (e.g., shafts and gears) or utilizing electric wheel motors at each of the separate tracks. The motors may be powered by a power source such as an internal combustion engine or a diesel engine that provides power to a generator which in turn stores the power in a battery for powering the motors.

SUMMARY OF THE INVENTION

Because an electric tracked vehicle has power available in electrical form, it is desirable to provide a transmission hydraulic system that is electrically-powered. However, in the event of an electrical power failure, it is important to ensure that the hydraulic system can still adequately control critical vehicle functions like braking and steering as well as provide cooling and lubrication. Accordingly, the invention provides a hydraulic system for an electro-mechanical transmission having an electrically-powered main pump with backup pump function provided by a battery-powered auxiliary pump and a mechanically-powered output pump in the event of electrical failure. Specifically, an electrically powered main pump provides fluid to transmission components including at least one torque-transmitting mechanism, and, preferably, brakes, first and second output housings that house fluid for cooling the brakes, as well as a general transmission lubrication circuit for lubricating transmission gearing and bearings, the steer motor and the drive motor.

The hydraulic system also includes a battery-powered auxiliary pump that is selectively operable, when the electric power to the main pump is unavailable, for providing sufficient fluid pressure to engage one of the torque-transmitting mechanisms. Engagement of the torque-transmitting mechanism operatively connects the drive motor to a transmission output member, thereby providing the ability to rotate the output member. An output pump is operably connected to the transmission output member and is mechanically-powered by the rotation of the output member to provide fluid to the transmission components for brake cooling, lubrication during towing, and in lieu of the main pump in the event of electrical power failure. The auxiliary pump and output pump may also provide this backup function for the main pump when the main pump fails for any other reason as well.

Preferably, the main pump is a multi-stage centrifugal pump with structure (such as a pump casing with rotatable impellers) forming a plurality of flow paths. The main pump is controllable to provide four stages including a cooling stage, a high pressure stage, and first and second scavenge stages. In the cooling stage, fluid pressure is provided by the main pump at a first (relatively high) flow volume and a first (relatively low) pressure. In the high pressure stage, fluid pressure is provided by the main pump at a second flow volume less than the first flow volume and a second pressure greater than the first pressure. The cooling stage may be for providing general lubrication to the lubrication circuit while the high pressure stage may be for engaging torque-transmitting mechanisms within the transmission. In the first scavenge stage, the main pump operates to return fluid at the first output housing to a sump. Similarly, in the second scavenge stage, fluid at the second output housing is returned to the sump. Thus, when the fluid is not necessary for cooling the brakes at the output housing (e.g., when the brakes are not being applied), the spin losses associated with the fluid are minimized by returning the fluid to the sump.

Upon a main pump failure or loss of electric power, the auxiliary pump may be controllable to cease providing fluid pressure to the torque-transmitting mechanism when the output member attains a predetermined speed. Thus, when the vehicle is sufficiently launched via the auxiliary pump's engagement of the torque-transmitting mechanism such that it attains a predetermined speed, the output pump takes over the function of providing fluid pressure to the transmission components.

An electric pump controller may be operatively connected to the main pump to control rotation of the main pump at a variable speed based on conditions such as speed of the output member (which may be correlated with speed of the vehicle), temperature of one or more transmission components, a predetermined flow volume requirement (including the fluid volume necessary to engage the torque-transmitting mechanism) and pressure of the fluid within the hydraulic system. By varying the speed of the pump based on the system operating conditions, energy losses associated with running the pump at higher than necessary speeds are minimized.

Because the output pump is powered mechanically by the output member, the output member will rotate during a towing operation if it is connected to one of the vehicle tracks (assuming that the vehicle tracks are in contact with the ground so that the towing rotates the tracks). Thus, the output pump will provide cooling fluid and lubrication to the transmission components when the vehicle is towed.

Preferably, the hydraulic system utilizes a variety of valves operable to direct fluid in an optimal manner to meet cooling and lubrication requirements. For example, at least one check valve is preferably located between the main pump and the transmission components and is operable to permit fluid to be delivered from the pump to the components during, for example, the cooling stage or the high pressure stage. However, the check valve prevents fluid at the transmission components from flowing back to the main pump when electric power is unavailable. That is, the check valve prevents undesirable draining and system pressure loss during an electrical power failure. A similar check valve may be employed between the output pump and the transmission components to prevent draining through the output pump when it is not in use.

An equalizer valve may also be provided, specifically for operation during an electric power failure, to permit fluid communication between one of the first or second output housings and the sump when electric power to the main pump is unavailable. Thus, the equalizer valve duplicates the function of the scavenge stage of the main pump, which is not available during the electric power failure.

A brake coolant valve may be provided that is operable to permit fluid communication from the output pump to the brakes when the brakes are applied in order to cool the brakes during brake application when heat generation is at a maximum level. Additionally, an output pump bypass valve may be provided that is operable to permit fluid communication from the output pump to the sump 34 when the brakes are not applied. Thus, spin losses associated with fluid provided at the brakes are minimized by minimizing the presence of fluid at the brakes when not required for proper brake function, lubrication or cooling. The output pump bypass valve may operate as a pressure regulator valve when the output pump is utilized during an electrical power failure. For instance, the output pump bypass valve may be configured to permit fluid flow to the sump at a predetermined pressure (e.g., from flow passages fluidly connected with the main pump's high pressure stage to the sump when fluid pressure in those flow passages exceeds a predetermined pressure).

A method of providing fluid to transmission components includes sending electrical power to a first (main) pump controllable to selectively provide fluid to the transmission components, including a torque-transmitting mechanism. If electric power to the main pump is unavailable or the main pump is inoperable for any other reason, the method includes sending battery power to a second (auxiliary) pump so that the auxiliary pump provides fluid to engage the torque-transmitting mechanism which enables rotation of a transmission output member to which the torque-transmitting mechanism is mechanically connected. The rotating transmission output member mechanically powers a third (output) pump (i.e., by a chain or other connective device) so that the output pump may provide fluid to the transmission components. Thus, the output pump acts as a redundant backup pump in case of failure of the first pump (due to a loss of electric power or any other reason).

Once the engaged torque-transmitting mechanism enables the transmission to launch the vehicle and the output pump can provide fluid for the transmission components, the method may include terminating battery power to the auxiliary pump. This may be when the rotation of the output member is characterized by a predetermined speed (i.e., a speed indicative of successful launch and output pump operability).

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Hydraulic System

Figure 1:
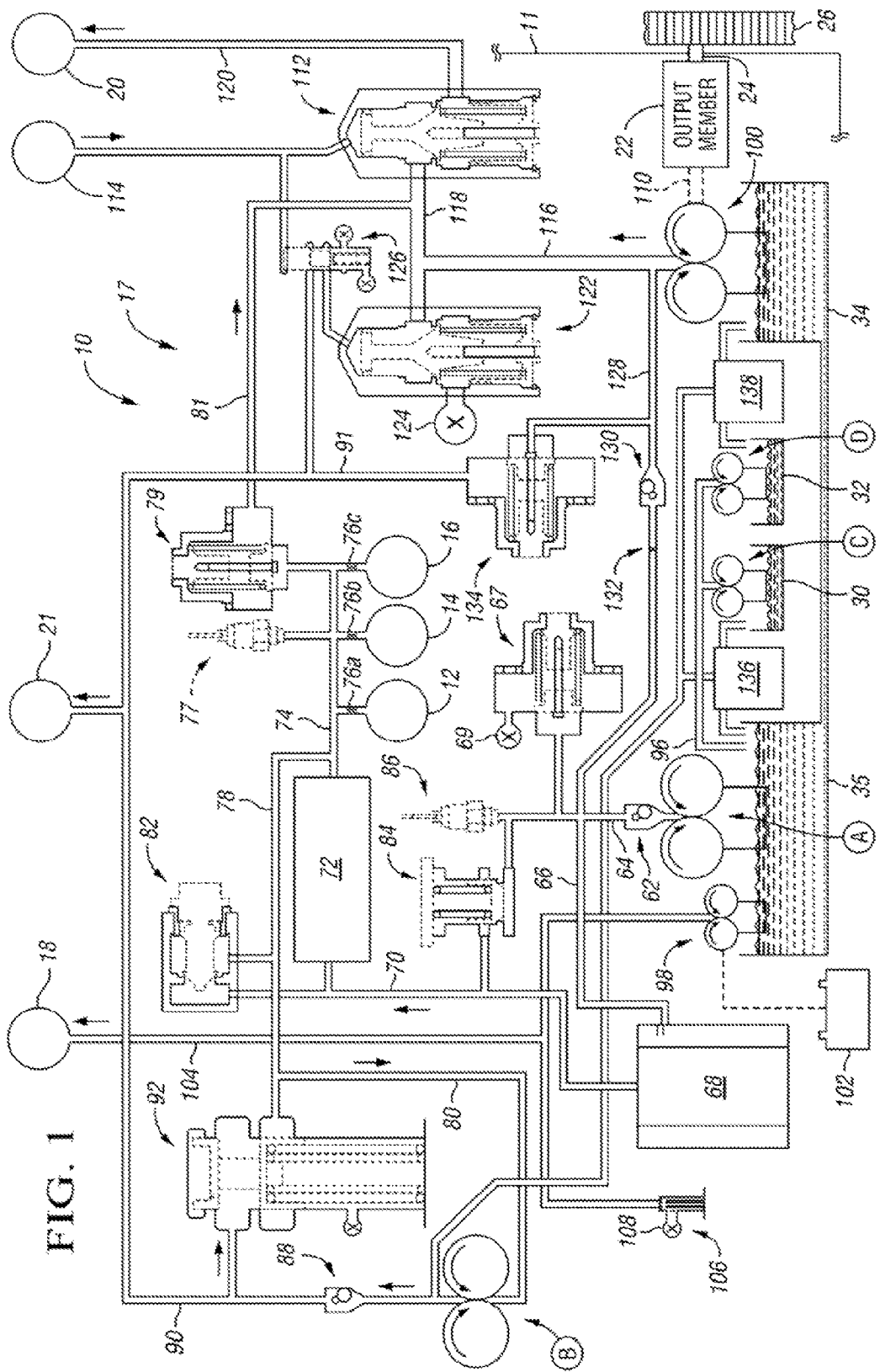
FIG. 1 is a schematic illustration of a hydraulic system for an electro-mechanical transmission of a tracked vehicle including a multi-stage main pump, an auxiliary pump, and an output pump.

Referring to the drawings, wherein like reference numbers refer to like components, FIG. 1 depicts a hydraulic system 10 for providing lubrication and cooling fluid to various transmission components on a tracked vehicle 11 including an electric drive motor 12, an electric steer motor 14, and a transmission lubrication circuit 16, which may be comprised of passages formed in transmission casing, tubing or any structure known in the art for directing lubrication to selected areas and to selected components within a transmission. The hydraulic system 10 lubricates and cools the transmission components, and is used on an electro-mechanical transmission 17. The transmission 17 is represented by various transmission components such as the lubrication circuit 16 and various torque-transmitting mechanisms such as a clutch referred to herein as C1 clutch, which may receive fluid at location 18. The hydraulic system 10 also provides cooling flow to vehicle brakes as represented at location 20. The C1 clutch and the brakes are also represented on FIG. 1 at a range and brake control location 21 as fluid may be communicated via alternative routes, as described below, to the C1 clutch and the brakes by operation of the hydraulic system 10. Preferably, the fluid is MIL-L-7808 fluid, which has a relatively low viscosity to reduce spin losses and support operation from −52 degrees Celsius (° C.) to 125° C. ambient temperature.

The transmission 17 also includes an output member 22 by which drive power is delivered via coupling 24 to a track 26 (shown in fragmentary view). A similar output member and track (not shown) are located on an opposing side of vehicle 11, as is understood by those skilled in the art. Transmission components also include a first output housing 30 and a second housing 32 depicted for purposes of the fluid control schematic of FIG. 1 in relation to a fluid sump 34 but, structurally located around the brakes.

Main Pump Assembly

Figure 2:
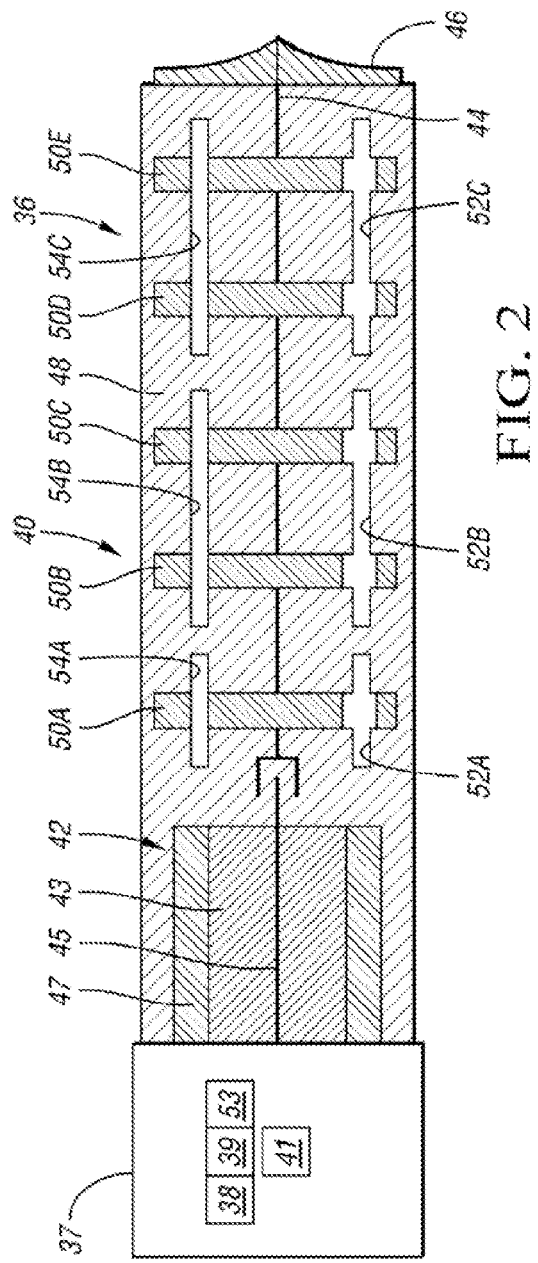
FIG. 2 is a side illustration in partial cross-sectional view of a pump assembly including the main pump of FIG. 1 and an electronic control module.
Figure 3:
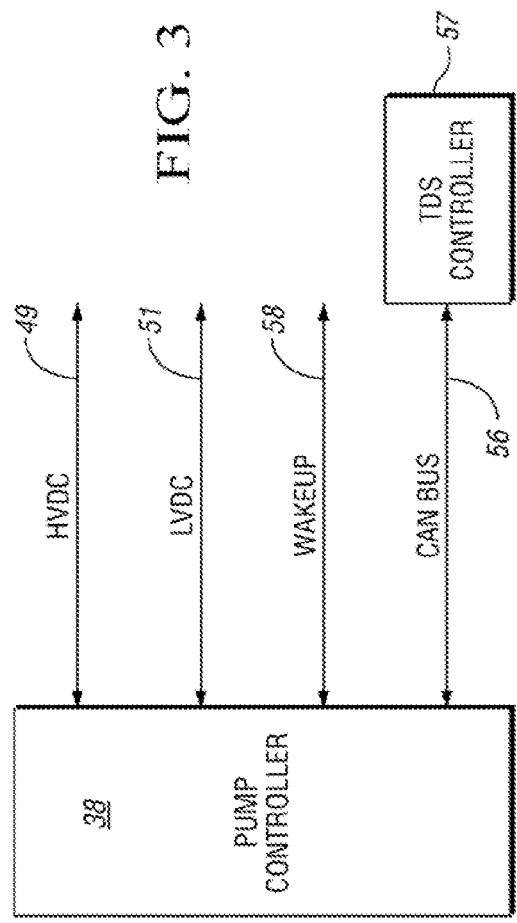
FIG. 3 is a schematic representation of electrical input to the main pump assembly of FIG. 2.

Referring now to FIG. 2, the hydraulic system 10 of FIG. 1 includes a line-replaceable main pump assembly 36. Main pump assembly 36 includes both an electronic control module 37 and an electric main pump 40 connected thereto. Specifically, the electric control module 37 and the main pump 40 receive power from a high voltage, direct current (DC) bus 49 as illustrated in FIG. 3. The bus 49 transmits power, preferably at 610 volts DC, from a power source such as a diesel engine in series with a generator and a lithium battery. However, any power source operable to deliver high voltage electrical power along a bus 49 may be utilized.

The main pump 40 includes an electric pump motor 42 which powers a pump shaft 44 operatively connected to a motor shaft 45 via a splined connection, as shown. The main pump 40 is a multi-stage pump including of a centrifugal type cooling pump, three fixed displacement pumps for main pressure and two scavenge pumps. An impeller 46 rotates with the pump shaft 44 and establishes pressurized fluid flow and may be referred to as a cooling flow stage. Main pump 40 includes a pump casing 48 that houses various rotors 50A-50E secured for rotation to the pump shaft 44 and establishing fluid flow paths between various pump inlets 52A, 52B, 52C and corresponding pump outlets 54A, 52B and 54C respectively to provide fluid at various volumes and pressures. The rotor 50A, pump inlet 52A and pump outlet 54A establish a first scavenge stage. The rotors 50B and 50C and the pump inlet 52B and pump outlet 54B establish a second scavenge stage. The rotors 50E and 50D and pump inlet 52C as well as pump outlet 54C establish a high pressure stage. The cooling stage is referred to as Stage A, the high pressure stage is referred to as stage B, the first scavenge stage may be referred to as stage C and the second scavenge stage is referred to as stage D in the schematic of FIG. 1.

Preferably, the motor 42 is a variable speed motor operable for turning the rotor 44 at speeds from a minimum of 2,000 revolutions per minute (rpm) up to a maximum of 8,000 rpm. Preferably, hydraulic system flow requirements of the various transmission components represented in FIG. 1 are met at 7,000 rpm (88% of maximum pump speed) to ensure an adequate design margin by providing for 14% capacity increase over the design point. Hydraulic systems flow requirements are determined based on monitored vehicle information and relayed to the pump controller 38 via a vehicle control area network (CAN) bus 56 illustrated in FIG. 3. A traction drive system (TDS) controller 57 uses an algorithm to set the speed of the main pump 40 according to monitored information such as speed of the transmission output member 22 of FIG. 1, temperature of one or more of the transmission components illustrated in FIG. 1, the flow volume requirement of the high pressure pump stage B of FIG. 1, including the flow volume requirements of the C1 clutch and other torque-transmitting mechanisms, and pressure of the fluid provided by the pump 40. Thus, because pump speed is set to current system needs, pump losses associated with running the pump 40 at an unnecessarily high speed are minimized. A speed sensor may be placed on the output member 22 or on another associated rotating component such as belt 110 to determine speed of the output member 22, as will be well understood by those skilled in the art.

Preferably, the TDS controller 57 monitors the vehicle information and relays a command over the CAN bus 56 of FIG. 3 to the pump controller 38 for controlling speed of the pump shaft 44 as well as a selected pump stage A-D. Preferably, the pump controller 38 also provides feedback via the CAN bus 56 to the TDS controller 57 to support prognostic detection of potential problems which will enable replacement of the main pump assembly 36 prior to failure.

Additionally, the CAN bus 56 permits the use of a controlled startup at an extremely low temperature (e.g., −51° C.) to prevent excess current spikes due to increased sheer viscosity of the fluid. A start up speed control algorithm is provided in the TDS which relays the start up signal to the pump controller 38 via the CAN bus 36.

A wake-up signal 58 is provided to the pump controller 38 upon vehicle start-up to activate the controller 38 and initiate communication with the TDS controller 57. The electronic control module 37 also includes a pump motor inverter 39. The pump motor inverter 39 is preferably a three phase power inverter which operates off of 610 volts DC provided via the bus 49 of FIG. 3. An inverter controller 41 controls the inverter 39 and operates off of a low voltage direct current (LVDC) represented by 51 in FIG. 3.

Preferably, the pump motor inverter 39 is mounted to the pump motor 42 with an integral cold plate which circulates transmission cooling fluid through internal oil passages in the cold plate to pull heat from the power inverter 39 and the controller 38. The entire main pump assembly 36 is designed as a line replaceable unit. The pump shaft 44 is vertically oriented when installed, enhancing quick removal and replacement. Preferably the high voltage bus 49 includes a high voltage interlock, as will be understood by those skilled in the art, to remove the 610 volt supply when the connector is removed during service or maintenance.

The pump motor 42 utilizes high temperature, samarium cobalt magnets that have high temperature capability and successfully operate at temperatures above 215° C. The magnets are mounted on the rotor portion 43 which rotates with the motor shaft 45 connected with the pump shaft 44. Other types of motors may be employed within the scope of the invention. The rotor 43 is made to rotate by electrical energy provided to stator 47. The oil sump 34 utilizes a narrow, tall containment volume and is centrally located in center housing 35 in order to optimize performance on steep grades.

Hydraulic System Operations

Referring now to FIG. 1, the four stages of the main pump 40 are illustrated at cooling stage A, high pressures stage B, first scavenge stage C and second scavenge stage D. Assuming HVDC electrical power is available, the main pump 40 in FIG. 2 is operable to provide each of these stages. The cooling stage A provides maximum cooling flow and is designed to provide 90 liters per minute (lpm) of fluid flow. The cooling stage A is provided by the impeller 46 of FIG. 2 and is a low pressure, high flow stage used to circulate fluid for transmission, cooling and lubrication purposes. The cooling stage A draws fluid from the sump 34 and provides fluid past a first check valve 62 along flow passage 64 through flow passage 66, through a filter 68, along flow passage 70 to cooler 72, and down flow passage 74 to restrictions 76A, 76B and 76C to cool and lubricate the drive motor 12, the steer motor 14 and the lubrication circuit 16, respectively. In addition, flow passage 78 routes to flow passage 80, permitting the cooling stage flow to supercharge the high pressure stage B, as will be discussed further below.

A cooler bypass valve 82 allows fluid flow from the flow passage 70 to the flow passage 74 bypassing the cooler 72 under specified pressure and temperature conditions in the cooler 72, specifically, when oil temperature is less than a predetermined level or cooler pressure drop is greater than a predetermined level. Similarly, a filter bypass valve 84 allows fluid to flow directly from flow passage 64 to flow passage 70 upon a predetermined pressure drop, bypassing flow passage 66 and the filter 68. A transducer 86 provides a warning that the filter bypass is about to occur. Pressure relief valve 67 directs excessive fluid to the sump 34 through exhaust port 69 if fluid pressure in flow passage 64 exceeds a predetermined level.

The high pressure stage B of the main pump 40 of FIG. 2 is operable to provide a high pressure, low flow (i.e., 30 lpm) of fluid to apply range and brake controls at 21, that is, to engage selected clutches and brakes as controlled by a TDS controller 57 of FIG. 3. In the high pressure stage, the fluid in flow passage 80 is further pressurized and passes through a second check valve 88 to flow passage 90 and to the range and brake controls at 21. A main regulator valve 92 is configured to vent excess fluid in flow passage 90 to flow passage 80. Any excess high pressure flow in flow passage 90 vented by pressure regulator valve 92 is recirculated to the pump inlet 52C via flow passage 80.

The main pump 40 of FIG. 2 also provides the first scavenge stage C and the second scavenge stage D, respectively as illustrated schematically in FIG. 1. The first scavenge stage C removes fluid from the first output housing 30 and returns it to the sump 34 of the center housing 35. Thus fluid is removed from the first output housing 30 and pumped along flow passage 96 to the sump 34. Similarly, the second scavenge stage D removes fluid from the second output housing 32 which is pumped along flow passage 96, which also connects to the scavenge pump discharge port, to the sump 34. Scavenging of the output housings 30, 32 reduces windage due to rotating components (such as gears and brakes) in these areas and increases the overall efficiency of the vehicle 11.

Hydraulic System Redundancy

Thus, the main pump 40 of FIG. 2 satisfies the hydraulic requirements of clutch apply, brake apply, cooling and lubrication for the vehicle 11 of FIG. 1 (while the output pump 100 described below provides brake cooling). However, in the event of failure of the main pump 40 or power loss along the 610 volt DC bus 49, the hydraulic system includes a redundant pump system that includes an auxiliary pump 98 and an output pump 100. The auxiliary pump 98 is relay-activated in the event of main pump 40 failure and is energized via battery 102 to deliver fluid at 4 lpm. Pump 98 thus charges the C1 clutch at 18 by delivering fluid along fluid flow passage 104. The C1 clutch is thus engaged, enabling rotation of output member 22 via mechanical connections thereto such as shafts and fears, as will be well understood by those skilled in the art. A pressure relief valve 106 is fluidly connected with the flow passage 104 and vents excessive fluid pressure to the sump 34 by opening exhaust port 108. Preferably, the pressure relief valve 106 opens at 2,000 kPa of pressure.

Once the engagement of C1 clutch at location 18 enables the output member 22 to drive the vehicle such that as the vehicle reaches a speed that allows a mechanically driven output pump 100 to generate flow and pressure to permit full automotive performance, as will be described below, the auxiliary pump 98 is shut off by a signal a from the TDS controller 57 of FIG. 3. The TDS controller 57 is battery powered rather than powered by 610 Volt DC along bus 49 and would still function in the event of 610 Volt power failure.

The output pump 100 is mechanically driven by rotation of the output member 22 to which it is connected via a chain belt or other mechanical connection device 110. The mechanically driven hydraulic output pump 100 provides high flow brake coolant to the brakes at 20 to remove energy from brake plates during braking and provides for lubrication when towing the vehicle 11 as will be described below. The brake cooling function of output pump 100 occurs even when the main pump 40 is operational, as the output pump 100 is mechanically-powered whenever the output member 22 is running. In addition, the output pump 100 includes valves and logic to support hydraulic system redundancy with respect to the main pump 40 to provide apply pressure to the torque-transmitting mechanisms and brake controls at 21 and for lubrication of the drive motor 12, steer motor 14 and lubrication circuit 16 as will be described below. Thus the output pump 100 provides operating system redundancy with respect to the main pump 40. For instance, when the brakes are being applied (as relayed to a brake coolant valve 112 by a brake signal valve 114), the brake coolant valve 112 allows flow from the output pump 100 along flow passages 116, 118 and 120 to the brakes at location 20. However, when the brakes are not being applied, the brake coolant valve 112 is not opened and an output pump bypass valve 122 allows discharge of output pump flow in passage 116 to the sump 34. The output pump bypass valve 122 also allows discharge of fluid (e.g., fluid in flow passage 91) to the sump 34 through exhaust port 124 when fluid in flow passage 91 reaches a predetermined level. A signal valve 126 is operatively connected between the brake coolant valve 112 and the output pump bypass valve 122. The signal valve 126 reverses the logic of the output pump bypass valve 122 by closing the output pump bypass valve 122 when the brake coolant valve 112 opens and visa versa.

An output pump check valve 134 responds to pressure levels in flow passages 91 and 128 and opens to allow fluid from the output pump 100 to feed flow passage 91 when positions of the brake coolant valve 112 and the output pump bypass valve 122 cause pressure build up in the flow passage 128, e.g., when the brake coolant valve 112 is closed and the output pump bypass valve 122 is not discharging fluid through exhaust port 124 because pressure in flow passage 91 is too low to activate output pump bypass valve 122.

Additionally, when the main pump 40 is not functional and pressure in flow passage 128 is greater than pressure in flow passage 66, the output pump 100 delivers up to 75 lpm of fluid along flow passage 128 through a check valve 130, a flow restriction 132, through the filter 68 and the cooler 72 to the drive motor 12, steer motor 14 and lubrication circuit 16 to maintain functionality. Additionally a lubrication pressure transducer 77 senses pressure within flow passage 74 and relays this information back to the electronic controller 38 so that a desirable adjustment of fluid flow may be initiated. A lubrication regulator valve 79 flows excess lube circuit oil back to sump 34 via valve 122 under normal operations (i.e., when brakes are not applied).

The check valves 62, 88 and 130 prevent undesirable discharge through the output of the high pressure stage B, the cooling stage A and the output pump flow passage 116 respectively. Specifically, check valve 88 prevents fluid from flowing through the high pressure stage B and check valve 62 prevents fluid from flowing through the cooling stage A when electric power failure causes the main pump 40 of FIG. 2 to fail. Also, in this condition, because the scavenge stages C and D are not functional, a first equalizer valve 136 and a second equalizer valve 138 open to allow the output housing 30, 32, respectively, to drain back to the sump 34. Check valve 130 prevents drainage along flow passage 66 through valves 112 or 122 when the main pump 40 is operational. The check valves 62, 88, 130 enable the hydraulic system 10 to function with flow from output pump 100 when the main pump 40 is inoperative.

With reference to the structure described in FIGS. 1 through 3, a method of providing fluid to transmission components of an electro-mechanical transmission includes sending electrical power (i.e., over bus 49) to a first pump (i.e., main pump 40) controllable (by the TDS controller 57 and electronic controller 38) to selectively provide fluid to the transmission components such as torque-transmitting mechanisms at range and brake controls (location 21), the C1 clutch at location 18 as well as other transmission components such as the drive motor 12, the steer motor 14, and including the transmission lubrication circuit 16. However, if electrical power along bus 49 is not available or the main pump 40 is otherwise inoperable, the method includes sending battery power (i.e., from battery 102) to a second pump (i.e., the auxiliary pump 98) to provide fluid to the torque-transmitting mechanism C1 clutch at location 18. The fluid engages the C1 clutch and enables rotation of transmission output member 22. Fluid is thereby provided by a third pump, i.e., the output pump 100 driven via the transmission output member 22, to the range and brake controls at location 21, the drive motor 12, the lubrication circuit 16, the steering motor 14 and the brakes at location 20. Additionally, the method may include terminating battery power (i.e., power from battery 102) to the auxiliary pump 98 when rotation of the output member 22 attains a predetermined speed. At this speed, the output pump 100 is sufficiently able to maintain full system hydraulic capability.

While the best mode for carrying out the invention has been described in detail, those familiar with the art to which this invention relates will recognize various alternative designs and embodiments for practicing the invention within the scope of the appended claims.

The invention claimed is:

1. A hydraulic system for an electro-mechanical transmission comprising:
an electrically-powered main pump operable for providing fluid to transmission components including a torque-transmitting mechanism;
a battery-powered auxiliary pump selectively operable, when electric power to said main pump is unavailable, for providing sufficient fluid pressure to engage said torque-transmitting mechanism to thereby enable rotation of a transmission output member; and
an output pump mechanically-powered by rotation of said transmission output member for providing fluid to said transmission components in lieu of said main pump.

2. The hydraulic system of claim 1, further comprising:
a sump;
wherein said transmission components include first and second output housings;
wherein said main pump has structure forming a plurality of flow paths controllable to provide:
a cooling stage in which fluid pressure provided by said main pump is characterized by a first flow volume and a first pressure;
a high pressure stage in which fluid pressure provided by said main pump is characterized by a second flow volume less than said first flow volume and a second pressure greater than said first pressure;
a first scavenge stage in which fluid at said first output housing is returned to said sump; and
a second scavenge stage in which fluid at said second output housing is returned to said sump.

3. The hydraulic system of claim 2, further comprising:
at least one check valve operable to permit fluid communication between said main pump and said transmission components in one of said cooling stage and said high pressure stage and to prevent such fluid communication when electric power to said main pump is unavailable.

4. The hydraulic system of claim 2, further comprising:
an equalizer valve operable to permit fluid communication between one of said first and said second output housings and said sump when electric power to said main pump is unavailable, said equalizer valve thereby functioning in lieu of said respective one of said first and said second scavenge stages.

5. The hydraulic system of claim 1, wherein said transmission components include brakes, and further comprising:
a brake coolant valve operable when the brakes are applied for permitting fluid communication between said output pump and said brakes for cooling said brakes.

6. The hydraulic system of claim 5, further comprising:
an output pump bypass valve;
a sump;
wherein said output pump bypass valve is operable when said brakes are not applied to permit fluid flow to said sump when fluid pressure exceeds a predetermined pressure.

7. The hydraulic system of claim 1, wherein said auxiliary pump is selectively controllable to cease providing fluid pressure when said output member attains a predetermined rotational speed; and
wherein fluid pressure to said transmission components is provided by said output pump when said output member rotates at a rotational speed not less than said predetermined rotational speed.

8. The hydraulic system of claim 1, wherein said main pump has a pump shaft that is rotatable to provide fluid pressure; and further comprising:
an electric pump controller operatively connected to said main pump and configured to control rotation of said pump shaft at a speed determined based at least partially on system operating conditions including at least one of speed of said output member; temperature of one or more of said transmission components, a predetermined flow volume requirement and fluid pressure.

9. The hydraulic system of claim 1, wherein said transmission is adapted to drive a tracked vehicle; and
wherein said output member is operatively connected to a track on the tracked vehicle such that said output member rotates when the track rotates during towing, said output pump thereby being operable for providing fluid to said transmission components when the vehicle is towed.

10. A hydraulic system for an electro-mechanical transmission comprising:
an electrically-powered main pump operable for providing fluid to transmission components including a torque-transmitting mechanism, wherein said main pump has a pump shaft that is rotatable to provide fluid pressure;
a battery-powered auxiliary pump selectively operable, when electric power to said main pump is unavailable, for providing sufficient fluid pressure to engage said torque-transmitting mechanism to thereby enable rotation of a transmission output member;
an output pump mechanically-powered by rotation of said transmission output member for providing fluid to said transmission components in lieu of said main pump; and
an electric pump controller operatively connected to said main pump and configured to control rotation of said pump shaft at a speed determined based at least partially on system operating conditions including at least one of speed of said output member, temperature of one or more of said transmission components, a predetermined flow volume requirement of said torque-transmitting mechanism and fluid pressure.

11. The hydraulic system of claim 10, further comprising:
a sump;
an output pump bypass valve operable when said brakes are not applied to permit fluid flow to said sump when fluid pressure exceeds a predetermined pressure.

12. A method of providing fluid to transmission components including a torque-transmitting mechanism comprising:
if electrical power is available, sending electrical power to a first pump controllable to provide fluid to the transmission components including the torque-transmitting mechanism;
if said electrical power is unavailable or said first pump is inoperable; sending battery power to a second pump so that the second pump provides fluid to the torque-transmitting mechanism, thereby engaging the torque-transmitting mechanism and enabling rotation of a transmission output member, wherein said rotating output member mechanically powers a third pump to provide fluid to the transmission components.

13. The method of claim 12, further comprising:
terminating battery power to the second pump when rotation of the output member is characterized by a predetermined speed.